(12) United States Patent
Uno et al.

(10) Patent No.: US 6,289,166 B1
(45) Date of Patent: Sep. 11, 2001

(54) VIDEO DATA RECORDING MEDIUM, VIDEO DATA RECORDING APPARATUS AND VIDEO DATA PLAYBACK APPARATUS

(75) Inventors: Tohru Uno; Yoshiyuki Ishizawa, both of Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/656,827

(22) Filed: Sep. 7, 2000

Related U.S. Application Data

(62) Division of application No. 09/381,284, filed as application No. PCT/JP99/00208 on Jan. 21, 1999.

(30) Foreign Application Priority Data

Jan. 21, 1998 (JP) .................................................. 10-009904

(51) Int. Cl.$^7$ .............................. H04N 5/76; H04N 5/781
(52) U.S. Cl. ............................................. 386/46; 386/125
(58) Field of Search ................................ 386/46, 94, 109, 386/111, 112, 124, 125, 105, 106, 52, 55, 1, 4, 45, 40; 360/15, 13; H04N 5/76, 5/781

(56) References Cited

U.S. PATENT DOCUMENTS 6,034,832 * 3/2000 Ichimura et al. ...................... 360/60

FOREIGN PATENT DOCUMENTS

| | | |
|---|---|---|
| 0 346 979 | 12/1989 | (EP) . |
| 0 635 835 A | 1/1995 | (EP) . |
| 0 696 798 A | 2/1996 | (EP) . |
| 0 724 264 A | 7/1996 | (EP) . |
| 0 795 871 A | 9/1997 | (EP) . |
| 0 797 205 A | 9/1997 | (EP) . |
| 09 073761 A | 3/1997 | (JP) . |
| WO 97 46007 A | 12/1997 | (WO) . |

OTHER PUBLICATIONS

Microsoft Windows 95, 1$^{st}$ Step Guide, File Editing System for Optical Disk and File Editing Format for Optical Disk.

* cited by examiner

*Primary Examiner*—Robert Chevalier
(74) *Attorney, Agent, or Firm*—Oblon, Spivak, McClelland, Maier & Neustadt, P.C.

(57) ABSTRACT

Video data divided into a plurality of cells, attribute information for specifying the playback order of the plurality of cells, and a flag for specifying whether the playback can be effected or not for each of the plurality of cells are recorded on an optical disk. In a playback apparatus, the cell which is specified to be inhibited from being played back by the flag is not played back when a plurality of cells are played back based on the playback order specified by the attribute information.

11 Claims, 14 Drawing Sheets

| TITLE NO. | START PHYSICAL ADDRESS OF UNNECESSARY PORTION | END PHYSICAL ADDRESS OF UNNECESSARY PORTION | TITLE NO. | START PHYSICAL ADDRESS OF UNNECESSARY PORTION | END PHYSICAL ADDRESS OF UNNECESSARY PORTION | ......... |
|---|---|---|---|---|---|---|

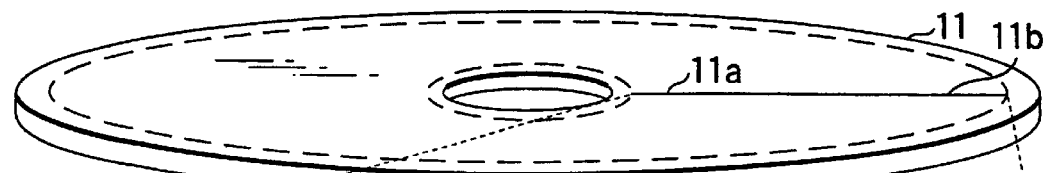
FIG. 2A
FIG. 2B
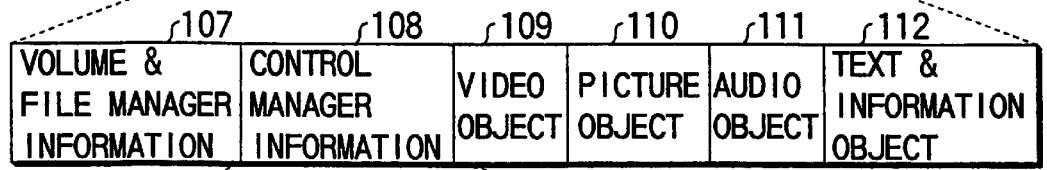
FIG. 2C
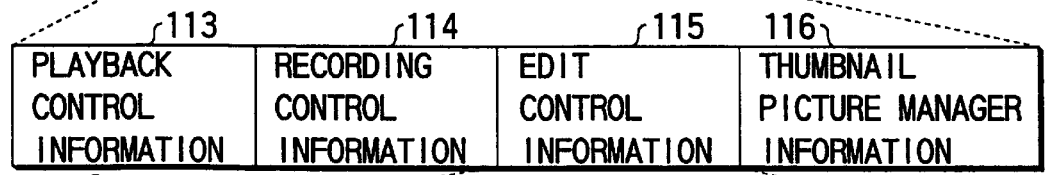
FIG. 2D
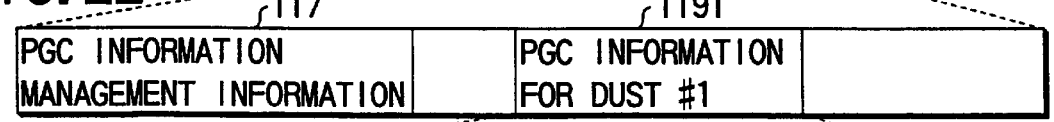
FIG. 2E
FIG. 2F
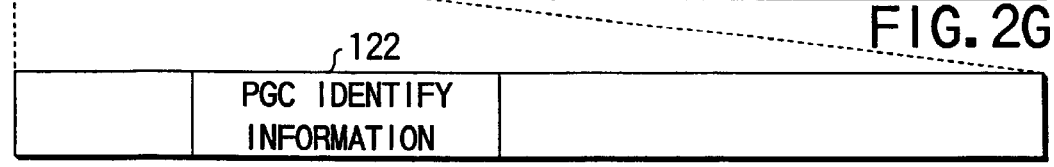
FIG. 2G
FIG. 2H

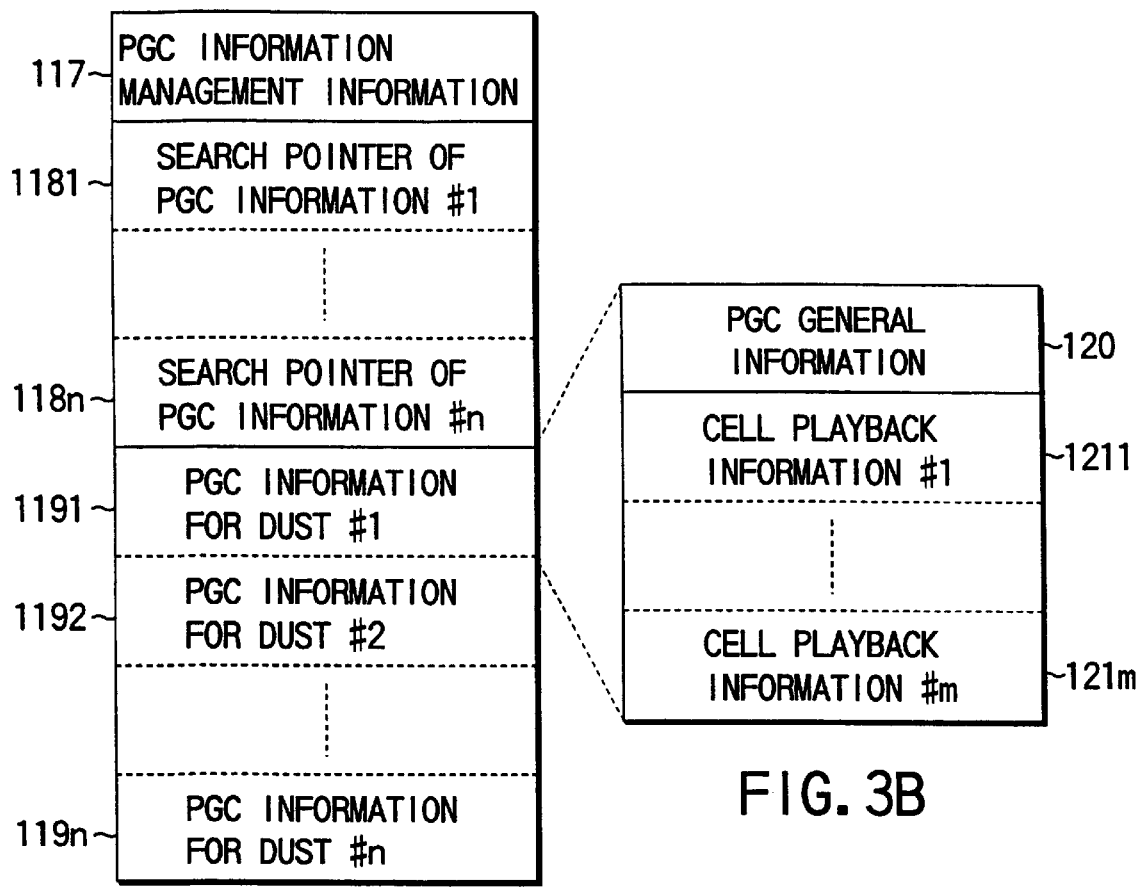
FIG. 3A
FIG. 3B
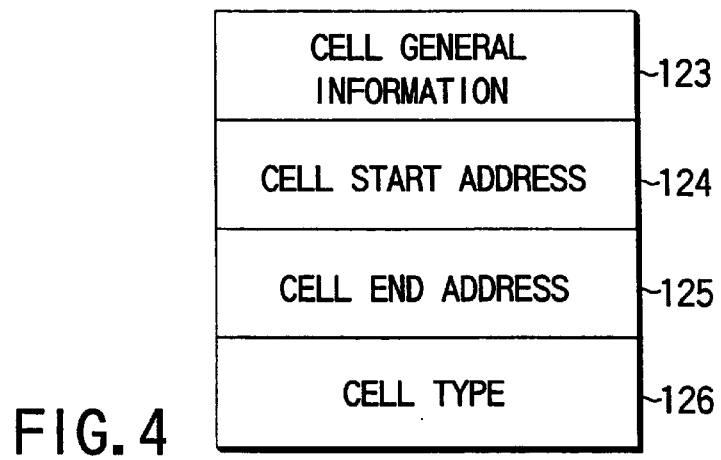
FIG. 4

```
TITLE MENU

NO.              YEAR,                                        UNNECESSARY
RECORD CH   MONTH, DATE      TIME         TITLE       PORTION
1. 8CH       1997-10-3    pm8:00~pm9:00    (NO)       PRESENT
2. 3CH       1997-10-10   pm9:00~pm10:00  ART         NO
                                           THEATER

┌─────────────┐
                                              │ OPEN DETAIL │
                                              │ INFORMATION │
                                              │ OF TITLE    │
                                              └─────────────┘
```

FIG. 10A

```
DETAIL INFORMATION FOR EACH TITLE

NO.            YEAR,                                     UNNECESSARY
RECORD CH   MONTH, DATE      TIME         TITLE       PORTION
1. 8CH       1997-10-3    pm8:00~pm9:00    (NO)       PRESENT

DETAILS OF UNNECESSARY PORTIONS
         1.  pm8:03:00~pm8:04:15
         2.  pm8:15:00~pm8:17:15
         3.  pm8:30:00~pm8:32:15

┌───────────┬───────────┬───────────┬───────────┐
│COMPLETE   │RESTORATION│COMPLETE   │RELEASE OF │
│RESTORATION│OF         │RELEASE OF │UNNECESSARY│
│OF         │UNNECESSARY│UNNECESSARY│PORTION    │
│UNNECESSARY│PORTION    │PORTION    │           │
│PORTION    │           │           │           │
└───────────┴───────────┴───────────┴───────────┘
```

FIG. 10B

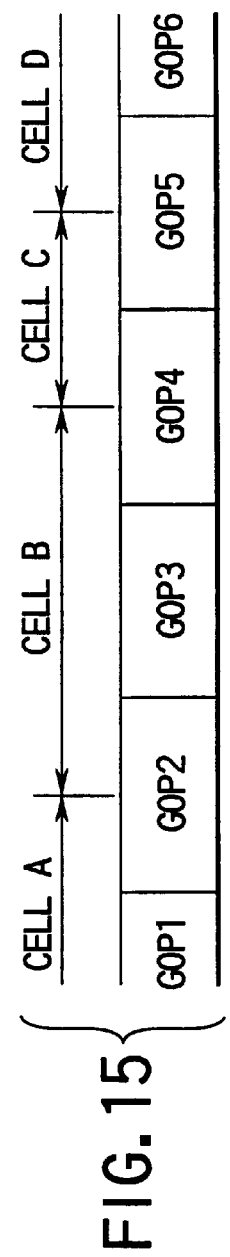
FIG. 12
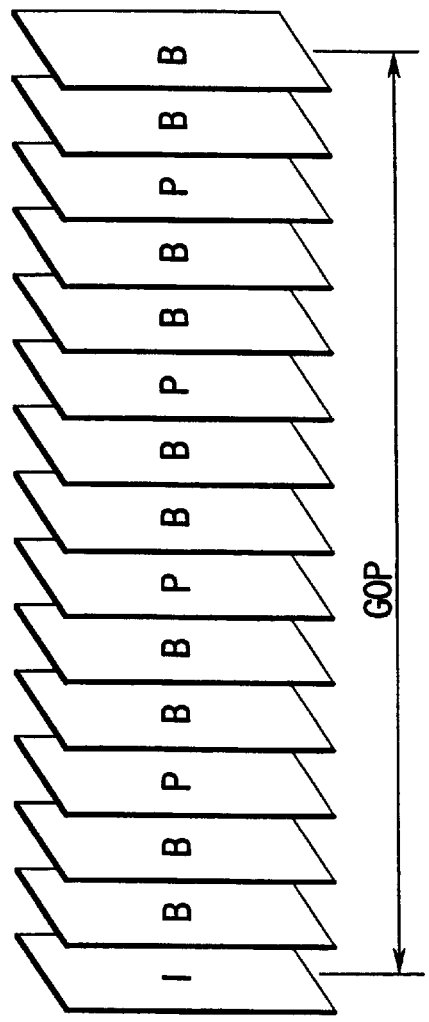
FIG. 15
FIG. 16

VIDEO DATA RECORDING MEDIUM, VIDEO DATA RECORDING APPARATUS AND VIDEO DATA PLAYBACK APPARATUS

This application is a Division of Ser. No. 09/381,284 filed Sep. 21, 1999, which is a 371 of PCT/JP99/00208 filed Jan. 21, 1999.

TECHNICAL FIELD

This invention relates to the improvement of a video data recording medium on which digital data such as compressed video data, sub-video data and audio data are recorded, for example. Further, this invention relates to the improvement of a video data recording apparatus for recording video data on the video data recording medium. This invention relates to the improvement of a video data playback apparatus for playing back video data from the video data recording medium. This invention makes it possible to easily effect the simple editing operation for video data recorded or played back.

BACKGROUND ART

As is well known in the art, recently, it becomes possible to record video data in a compressed form as well as audio data on an optical disk having the same diameter of 12 cm as an audio CD (Compact Disk), for example. As this type of optical disk, for example, a CD-ROM (Read Only Memory) is popularly used in a wide range of field from the education field to information field.

Further, recently, a DVD-ROM or the like which is an optical disk having the same diameter as the CD and on which main video data of an amount corresponding to an approximately 2-hour movie, 8 types of audio data items and sub-video data representing 32 types of captions are recorded is developed. At present, a DVD standard using the MPEG (Moving Picture Image:Coding Experts Group) 2 compression system based on the international standard for video data and using the AC-3 compression system for audio data is proposed.

According to the DVD standard, MPEG2 is used for the video compression system according to the MPEG2 system layer, the AC-3 system and MPEG system are supported as the audio compression system, and sub-video data obtained by subjecting bit map data to the run-length compression as the caption and control data (navigation pack) for special playback such as playback at the time of quick feeding and quick returning are additionally provided.

Further, in the DVD standard, ISO (International Organization for Standardization) 9660 and micro UDF (Universal Disk Format) are supported so that data can be read by use of a personal computer and the like, for example.

At present, not only the playback only optical disk such as the DVD-ROM described above but also an optical disk such as a DVD-RAM (Random Access Memory), for example, in which data can be programmed or rewritten is developed and an apparatus for recording/playing back data on or from the optical disk is actively developed.

When video data recorded on or played back from the DVD-RAM is edited according to the DVD standard, it is necessary to effect the editing operation using the authoring system as in the conventional DVD-ROM. For this reason, there occurs a problem that it takes a long time and much labor for the user and the financial burden for preparing a device for the authoring system is imposed on the user.

DISCLOSURE OF INVENTION

This invention has been made in view of the above problem and an object of this invention is to provide a video data recording medium, video data recording apparatus and video data playback apparatus in which video data recorded or played back can be easily subjected to the simple editing operation.

A video data recording medium according to this invention comprises a first area in which video data divided into a plurality of unit data items is recorded; a second area in which attribute information for specifying the playback order of the plurality of unit data items recorded in the first area is recorded; and a third area in which first control information for specifying whether data can be played back or not for each of the plurality of unit data items is recorded.

A video data recording apparatus according to this invention comprises recording means for recording video data divided into a plurality of unit data items, attribute information for specifying the playback order of the plurality of unit data items and first control information for specifying whether data can be played back or not for each of the plurality of unit data items on a recording medium.

A video data playback apparatus according to this invention comprises playback means for playing back a recording medium on which video data divided into a plurality of unit data items, attribute information for specifying the playback order of the plurality of unit data items and first control information for specifying whether data can be played back or not for each of the plurality of unit data items are recorded.

Further, the playback means effects the control operation so as not to play back the unit data item which is specified to be inhibited from being played back by the first control information when the plurality of unit data items are played back based on the playback order specified by the attribute information.

With the above construction, since the first control information for specifying whether data can be played back or not for each of the plurality of unit data items is recorded on the recording medium, the simple editing operation for playing back data while skipping unnecessary data portion at the time of playback or restoring the unnecessary data portion can be easily effected without using the authoring system as in the conventional case.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A to 2H are diagrams for illustrating the hierarchical structure of data recorded on an optical disk;

FIGS. 3A and 3B are diagrams for illustrating edit control information in detail;

FIG. 4 is a diagram for illustrating cell playback information in detail;

FIGS. 10A and 10B are diagrams for illustrating the title menu screen and the screen of the detail information for each title;

FIG. 12 is a diagram for illustrating a deleting portion reference table when a deleting portion is used again;

FIG. 15 is a diagram for illustrating a case wherein boundaries between successive cells lie on the intermediate portions of GOPs;

FIG. 16 is a diagram for illustrating an example of the frame construction of one of the GOPs in the MPEG standard.

BEST MODE OF CARRYING OUT THE INVENTION

Figure 1:
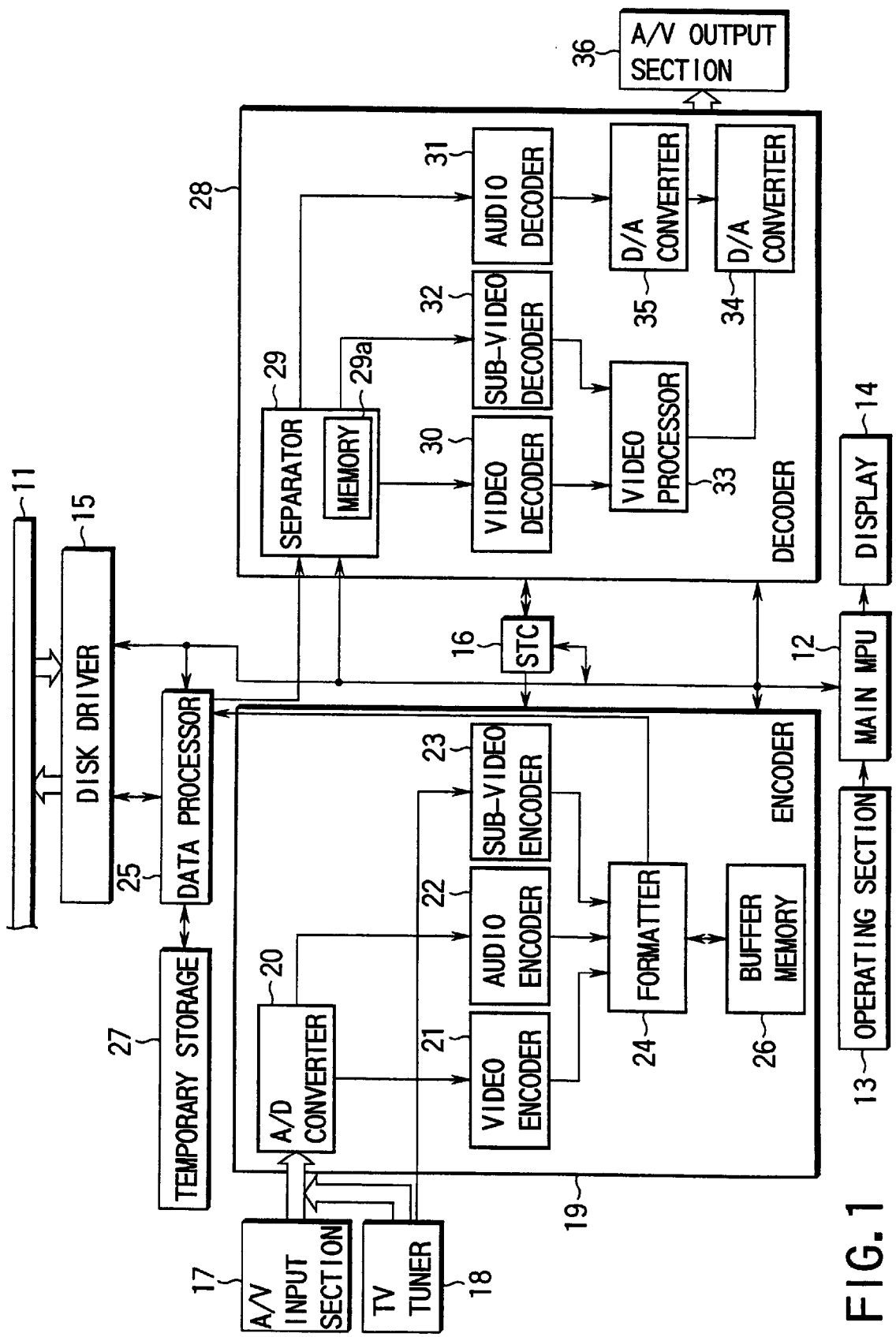
FIG. 1 is a block diagram showing a recording/playback apparatus, for illustrating one embodiment of this invention.

There will now be described an embodiment of this invention in detail with reference to the accompanying drawings. FIG. 1 shows a recording/playback apparatus for recording/playback data on or from an optical disk 11 such as a DVD-RAM.

The recording/playback apparatus is generally controlled by a main MPU (Micro Processing Unit) 12. The main MPU 12 receives a request from the user via an operating section 13 to control the recording/playback apparatus and displays the control state thereof on a display section 14.

The optical disk 11 is controlled by a disk driver 15 which is driven according to an instruction from the main MPU 12. The disk driver 15 has a function of rotating and driving the optical disk 11 at a preset rotation speed by use of a disk motor and rotation servo circuit (not shown) and a function of programming data into or reading out data from the optical disk 11 by use of an optical head and servo circuit (not shown).

The recording operation for the optical disk 11 is explained. First, when the main MPU 12 receives a record instruction from the operating section 13, it reads management data from the optical disk 11 via the disk driver 15 and determines an area in which data is to be programmed.

Then, the main MPU 12 sets the program starting address of the determined area into the disk driver 15 to complete the preparation for recording data. Further, the main MPU 12 resets an STC (System Time Counter) 16 which is a timer for counting time used as reference when the recording/playback apparatus effects the recording operation or playback operation.

A video signal and audio signal supplied from an external A/V (Audio/Video) input section 17 or a video signal and audio signal supplied from a TV (Television) tuner 18 are supplied to an A/D (Analogue/Digital) converter 20 constituting an encoder 19 and converted into a digital form and then supplied to a video encoder 21 and audio encoder 22. Further, a text signal and closed caption signal in the text broadcasting obtained from the TV tuner 18 are supplied to a sub-video encoder 23.

The encoders 21, 22, 23 subject the input signals to the compression process to set them into a packet form and output the packets to a formatter section 24. In this case, each packet is separately formed such that one pack contains 2048 bytes when the packet is divided into a pack form later. Further, each of the encoders 21, 22, 23 determines a PTS (Presentation Time Stamp) and DTS (Decoding Time Stamp) of each packet based on the count value of the STC 16.

The formatter section 24 sets input packet data into a pack form, subjects the pack to the alignment process for each GOP (Group of Picture), attaches a navigation pack to the head portion of the GOP and outputs the same to a data processor 25. In this case, a buffer memory 26 is used for temporarily storing packet data when the process of the formatter section 24 is effected.

The data processor 25 collects data output from the encoder 19 as described above for every 16 packs to form ECC (Error Correcting Code) groups, attaches an ECC to each group and outputs the same to the disk driver 15.

However, if the disk driver 15 does not complete the preparation for recording data, the data processor 25 holds data in a temporary storage section 27, waits until the disk driver 15 completes the preparation for recording data, transfers data to the disk driver 15 to record data on the optical disk 11 when the preparation for recording data is completed.

Since the temporary storage section 27 holds recording data of several minutes or more by high-speed access, it is assumed that the temporary storage section of large storage capacity is used. The data processor 25 records address data of each navigation pack in an area of the optical disk 11 in which data items of quick feeding and quick returning in the navigation pack are recorded and records necessary information in the management area of the optical disk 11 in the final stage of the data recording process and then terminates the recording operation.

Next, the playback operation for the optical disk 11 is explained. First, when the main MPU 12 receives a playback instruction from the operating section 13, it reads data of the management area of the optical disk 11 via the disk driver 15 and data processor 25 and determines an address used for the data playback.

After this, the main MPU 12 outputs the determined address and readout instruction to the disk driver 15. Then, the disk driver 15 reads out sector data from the optical disk 11 based on the input readout instruction and outputs the same to the data processor 25.

In this case, the data processor 25 subjects the input sector data to the error correction process, converts the data into a pack data form and then outputs the data to a separating section 29 constituting a decoder 28. The separating section 29 separates the input packet data into video packet data, audio packet data and sub-video packet data.

Then, the video packet data, audio packet data and sub-video packet data are respectively supplied to a video decoder 30, audio decoder 31 and sub-video decoder 32. In this case, the navigation pack is held in a built-in memory 29a of the separating section 29 so as to be processed by the main MPU 12 and thus the main MPU 12 can always access the navigation pack.

When the packet data items separated by the separating section 29 are respectively transferred to the decoders 30, 31, 32, a PTS is loaded on the STC 16. The loading process is effected by causing the main MPU 12 to load the PTS of the navigation pack on the STC 16 or by causing the video decoder 30 to automatically load the PTS of the video data on the STC 16, for example.

For this reason, the decoders 30, 31, 32 can effect the packet data playback process while comparing the values of the PTS in the packet data with the count value of the STC 16, that is, in synchronism with the value of the PTS.

Thus, the video data and sub-video data processed for playback in the video decoder 30 and sub-video decoder 32 are supplied to and synthesized in a video processor 33 and then converted into an analog form by a D/A (Digital/Analogue) converter 34. Further, audio data processed for playback in the audio decoder 31 is converted into an analog form by a D/A converter 35. Then, outputs of the D/A converters 34, 35 are output to the exterior via an A/V output section 36.

FIGS. 2A to 2H shows the structure of data recorded on the optical disk 11. That is, the optical disk 11 shown in FIG. 2A is divided into a lead in area 101, data area 102 and lead out area 103 arranged in this order from the inner peripheral side 11a towards the outer peripheral side 11b as shown in FIG. 2B.

The lead in area 101 is divided into an embossed data zone whose light reflection surface is formed in an irregular form, a mirror zone whose surface is formed as a flat mirror surface and a rewritable data zone in which data can be rewritten.

Further, the data area 102 includes a rewritable data zone in which data can be recorded/rewritten by the user. The lead out area 103 includes a rewritable data zone in which data can be rewritten.

Information relating to the whole portion of the optical disk such as the type, size, recording density, and physical sector numbers indicating the recording start/recording end positions of the optical disk, information relating to the recording/playback/erase characteristics such as the recording power, recording pulse width, erase power, playback power and linear speeds at the time of recording/erase and information relating to the manufacturing process of each optical disk such as the manufacturing number are recorded in the embossed data zone of the lead in area 101.

An area in which a disk name inherent to each optical disk can be recorded, a trial recording area used for confirming the recording/erase condition of data, and an area in which management information relating to the defect area of the data area is recorded are set in the rewritable data zone of the lead in area 101 and the lead out area 103.

Further, in the data area 102, as shown in FIG. 2C, two computer areas 104, 105 for recording computer data and an audio & video data area 106 for recording audio and video data are set and computer data and audio and video data can be recorded together in the data area. However, the recording order and recording information size of the computer data and audio and video data can be freely set.

As shown in FIG. 2D, the audio & video data area 106 includes volume & file manager information 107, control manager information 108, video object 109, picture object 110, audio object 111 and text & information object 112.

The volume & file manager information 107 is information relating to the whole portion of volume or a file of audio and video data. The video object 109 is information of the contents of video data. The picture object 110 is information of a still picture such as a still or slide or a thumbnail picture for edition or for searching for a scene of. video data which the user wants to see. The audio object 111 is information of the contents of audio data. The text & information object 112 is a text signal of text broadcasting or other information.

The control manager information 108 is control information necessary for effecting various processes such as recording, playback, edition and searching of data, and as shown in FIG. 2E, it includes a playback control information 113, recording control information 114, edit control information 115 and thumbnail picture manager information 116.

In this case, the playback control information 113 is control information necessary at the time of playback. The recording control information 114 is control information necessary at the time of recording. The thumbnail picture manager information 116 is management information relating to a thumbnail picture for edition or for searching for a scene of video data which the user wants to see.

The edit control information 115 is control information necessary at the time of edition and has a data structure such as a PGC (Program Chain) information table as shown in FIG. 3A for determining the order of playback based on the PGC and the cells. That is, the PGC indicates a unit which specifies the order of playback of a plurality of cells to effect a series of playback processes and the cell indicates a playback segment of playback data specified by a start address and end address.

The PGC information table includes PGC information management information 117, n search pointers of PGC information #1 1181 to #n 118n, and n PGC information items for dust #1 1191 to #n 119n.

The PGC information management information 117 contains information (number of PGC information) indicating the number of PGCs. The n search pointers of PGC information #1 1181 to #n 118n respectively point the head addresses of the PGC information items for dust #1 1191 to #n 119n to simplify the searching for the PGC information items for dust #1 1191 to #n 119n.

As shown in FIG. 3B, each of the PGC information items for dust #1 1191 to #n 119n includes PGC general information 120 and m cell playback information items #1 1211 to #m 121m.

In this case, the PGC general information 120 includes information (number of cell playback. information) indicating the playback time for PGC and the number of cells, and as shown in FIG. 2H, it contains PGC identify in formation 122.

Further , as shown in FIG. 4, each of the cell playback information items #1 1211 to #m 121m includes cell general information 123, cell start address 124, cell end address 125 and cell type 126.

The cell general information 123 includes general information such as the playback time of a cell. The cell start address 124 and cell end address 125 respectively indicate the start address and end address of a segment played back as a cell. In the cell type 126, information (flag) for controlling whether the playback for the cell can be effected or not is described and the detail explanation therefor is made later.

Figure 5:
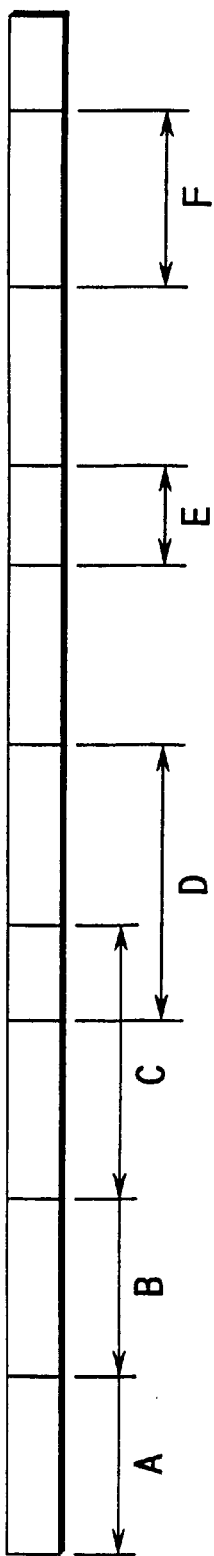
FIGS. 5A to 5D are diagrams for illustrating the cell playback operation based on PGC information.

Assume now that the playback segments A, B, C, D, E, F are specified as cells for data recorded on the optical disk 11 as shown in FIG. 5A. Then, if the three cells A, B, C specifying the successive playback segments are described in the PGC information for dust #1 1191, for example, as shown in FIG. 5B, the playback operation for the cells A, B, C is successively effected in this order. the intermittent playback segments are described in the PGC information for dust #2 1192 as shown in FIG. 5C, the playback operation for the cells D, E, F is successively effected in this order. Further, if the five cells E, A, D, B, E specifying the playback segments irrespective of the playback direction and overlap playback are described in the PGC information for dust #3 1193 as shown in FIG. 5D, the playback operation for the cells E, A, D, B, E is successively effected in this order.

Next, the cell type 126 is explained. The cell type 126 is constructed by one byte (8 bits) and indicates the playable state and inhibition of deletion (normal) in the case of "00(h: hexadecimal notation)", the inhibition of playback and inhibition of deletion (dust box sequence) in the case of "01(h)" and a deletable state in the case of "FF(h)", for example. Therefore, it is possible to control whether the playback can be effected or not for each cell unit.

Further, in the PGC identify information 122 in the PGC general information 120 contained in each of the PGC information items for dust #1 1191 to "n 119n, information (flag) for controlling whether a series of continuous playback processes for the cells specified by the PGC information items for dust #1 1191 to #n 119n can be effected or not is described.

That is, the PGC identify information 122 is constructed by one byte and indicates the playable state and inhibition of deletion (normal) in the case of "00(h)", a deletable state in the case of "01(h)" and the inhibition of playback and inhibition of deletion (dust box sequence) in the case of "11(h)", for example. Therefore, it is possible to control whether the playback can be effected or not for each PGC unit.

Further, in the PGC information management information 117 in the PGC information table shown in FIG. 3A, a flag DUST_DAT Flag indicating whether or not unnecessary data, that is, data set in the state of inhibition of playback and inhibition of deletion or deletable state by the flags of the cell type 126 and PGC identify information 122 is present in the PGC information table is contained. The flag DUST_DAT Flag is constructed by one byte and indicates that there is no unnecessary data in the case of "00(h)" and the unnecessary data is present in the case of "01(h)", for example.

Further, a flag DUST_EDIT Flag indicating whether or not the flag of the cell type 126 or PGC identify information 122 is changed in the past, that is, the presence or absence of the edit history is contained in the PGC information management information 117.

The flag DUST_EDIT Flag is constructed by one byte and indicates that there is no edit history in the case of "00(h)" and the presence of edit history in the case of "01(h)", for example. Therefore, it is possible to obtain information on the presence or absence of unnecessary data or the presence or absence of edit history for each title which is a set of a plurality of PGCs, for example.

Therefore, by adequately setting the flags in the PGC information management information 117, PGC identify information 122 and cell type 126, it becomes possible to easily effect the simple edit operation for skipping the unnecessary data portion in the playback process or restoring the unnecessary data portion without using the authoring system as in the conventional case.

In order to realize a function of making it possible to effect the simple edit operation and effect the seamless playback for the edited data and realize efficient deletion of unnecessary data, it is necessary to previously divide the cells in the unit of GOP at the time of data recording.

Further, since the minimum edit unit in the simple edit function is a cell, it is necessary to record data while setting the cell length to a short fixed length of approx. 0.5 second, for example, in order to precisely set the edit range to a certain degree.

Figure 6:
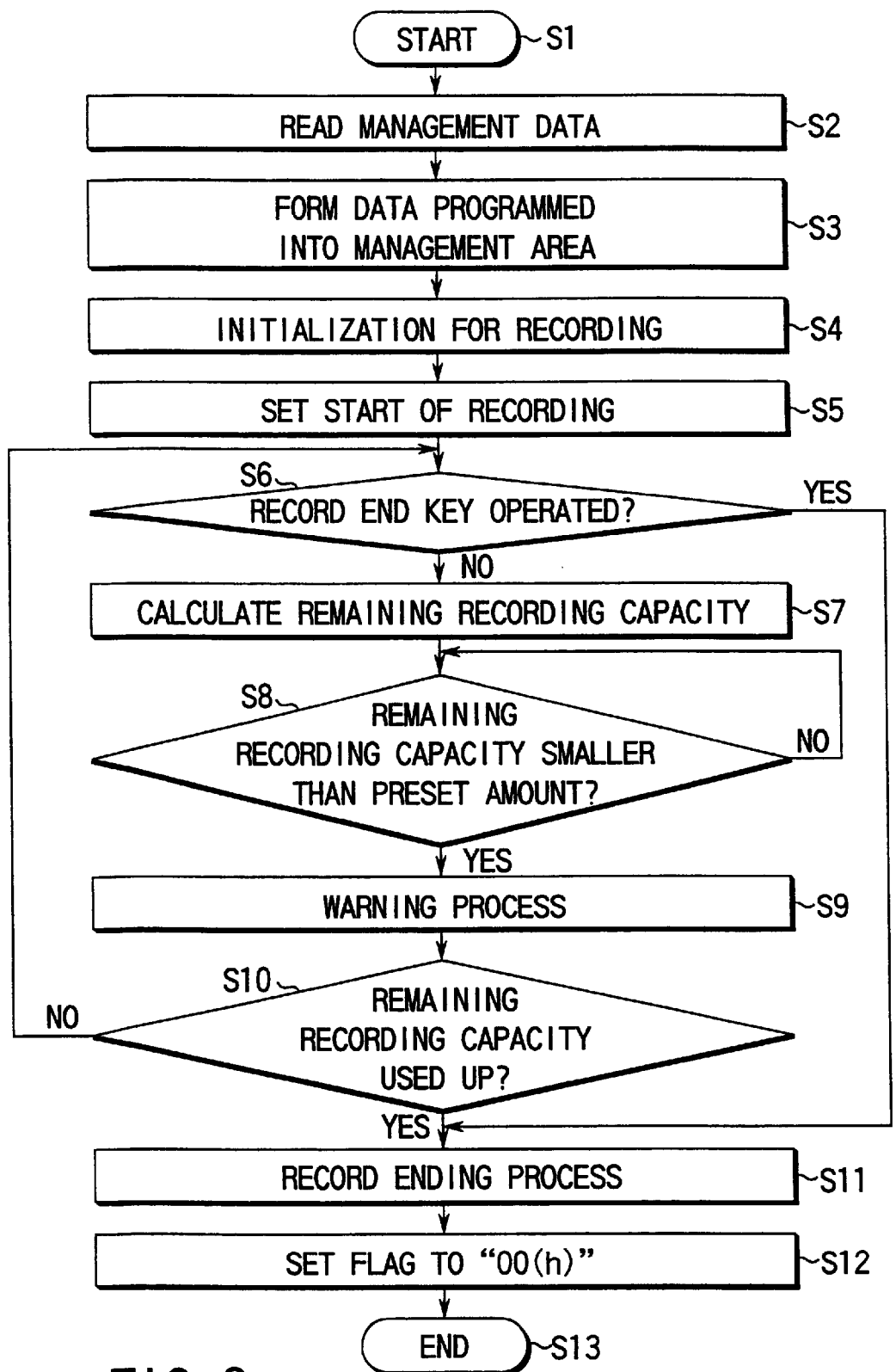
FIG. 6 is a flowchart for illustrating the data recording operation for an optical disk.

FIG. 6 is a flowchart showing the data recording operation for the optical disk 11. First, when a recording instruction is received by the main MPU 12 and the process is started (step S1), the main MPU 12 reads management data from the optical disk 11 in the step S2 and forms preset data to be programmed into the management area of the optical disk 11 in the step S3 and effects the initialization for recording in the step S4.

As the initialization for recording, for example, the initialization of the encoders 21, 22, 23, the operation for resetting the STC 16, the operation for setting the program start address into the disk driver 15 and the initialization of the formatter section 24 such as the operation for setting insertion of a dummy pack and setting the cell division time, for example, are effected.

After this, the main MPU 12 sets the record start instruction for each of the encoders 21, 22, 23 and starts the operation for recording data on the optical disk 11 in the step S5. In the recording operation, the main MPU 12 determines whether the record end key of the operating section 13 is operated or not in the step S6 and calculates the remaining recording capacity of the optical disk 11 in the step S7 if the record end key is not operated (NO).

Then, the main MPU determines whether the remaining recording capacity becomes smaller than a preset amount or not in the step S8 and effects the warning process, for example, displays that the remaining recording capacity of the optical disk 11 becomes smaller on the display 14 in the step S9 when it determines that the remaining recording capacity becomes smaller than the preset amount (YES).

After this, the main MPU 12 determines whether or not the remaining recording capacity of the optical disk 11 is used up in the step S10 and effects the step S6 if the remaining recording capacity of the optical disk 11 is not used up (NO). Further, if it is determined in the step S10 that the remaining recording capacity of the optical disk 11 is used up (YES) or if it is determined in the step S6 that the record end key is operated (YES), the main MPU 12 effects the record end process in the step S11.

As the record end process, the process for initializing the encoders 21, 22, 23 and the formatter section 24 and the process for programming information relating to the PGC and available capacity and data formed in the step S3 into the management area of the optical disk 11 are provided.

Then, the main MPU 12 sets all of the flags of the PGC information management information 117, PGC identify information 122 and cell type 126 to "00(h)" as initial values in the step S12 and terminates this process (step S13).

Figure 7:
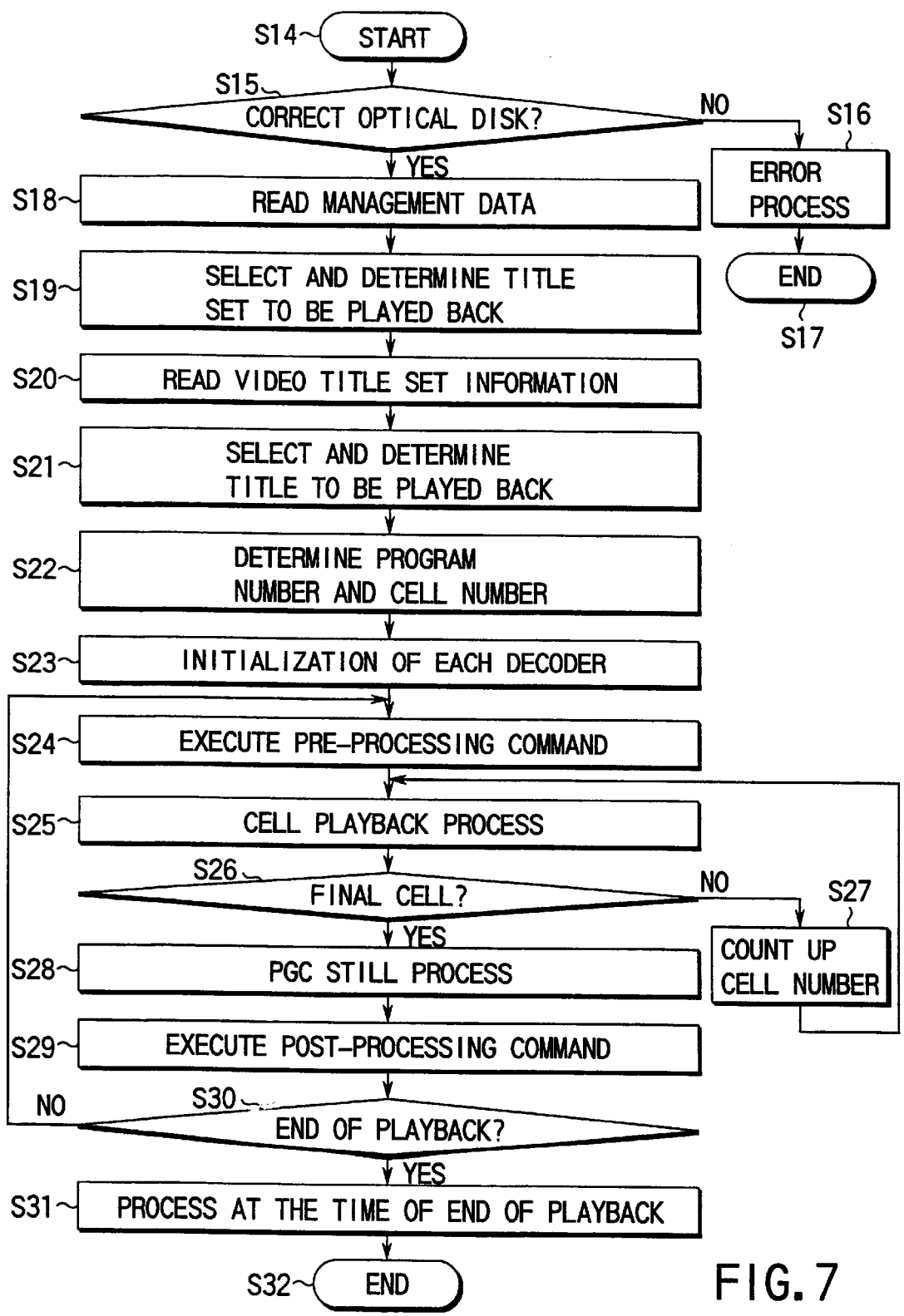
FIG. 7 a flowchart for illustrating the data playback operation for an optical disk.

FIG. 7 is a flowchart for illustrating the data playback operation for the optical disk 11. First, when the playback instruction is received by the main MPU 12 and the process is started (step S14), the main MPU 12 determines whether or not a correct optical disk 11 suitable for the recording/playback apparatus is mounted thereon in the step S15 and effects the error process in the step S16 if it determines that a correct optical disk 11 is not mounted (NO) and terminates the process (step S17).

If it is determined in the step S15 that a correct optical disk 11 is mounted (YES), the main MPU 12 reads management data from the optical disk 11 in the step S18 and selects and determines a title set to be played back in the step S19. Then, the main MPU 12 reads video title set information from the optical disk 11 in the step S20 and selects and determines a title to be played back in the step S21.

After the main MPU 12 determines the program number and cell number to be played back in the step S22, it initializes the decoders 30, 31, 32 in the step S23, executes the preprocessing command in the step S24 and then effects the cell playback process which will be described later in the step S25. In the cell playback process, the main MPU 12 determines whether the cell is a final cell or not in the step S26 and counts up the cell number in the step S27 and returns the process to the step S25 if it is not the final cell.

Further, if it is determined in the step S26 that the cell is the final cell (YES), the main MPU 12 effects the PGC still process for displaying the still screen for a set period of time in the step S28, executes the post-processing command in the step S29 and then determines whether the playback process is terminated or not in the step S30. If the playback process is not terminated (NO), the main MPU 12 returns the process to the step S24 and if the playback process is terminated (YES), the main MPU 12 effects the process at the time of end of the playback process in the step S31 and terminates the process (step S32).

Figure 8:
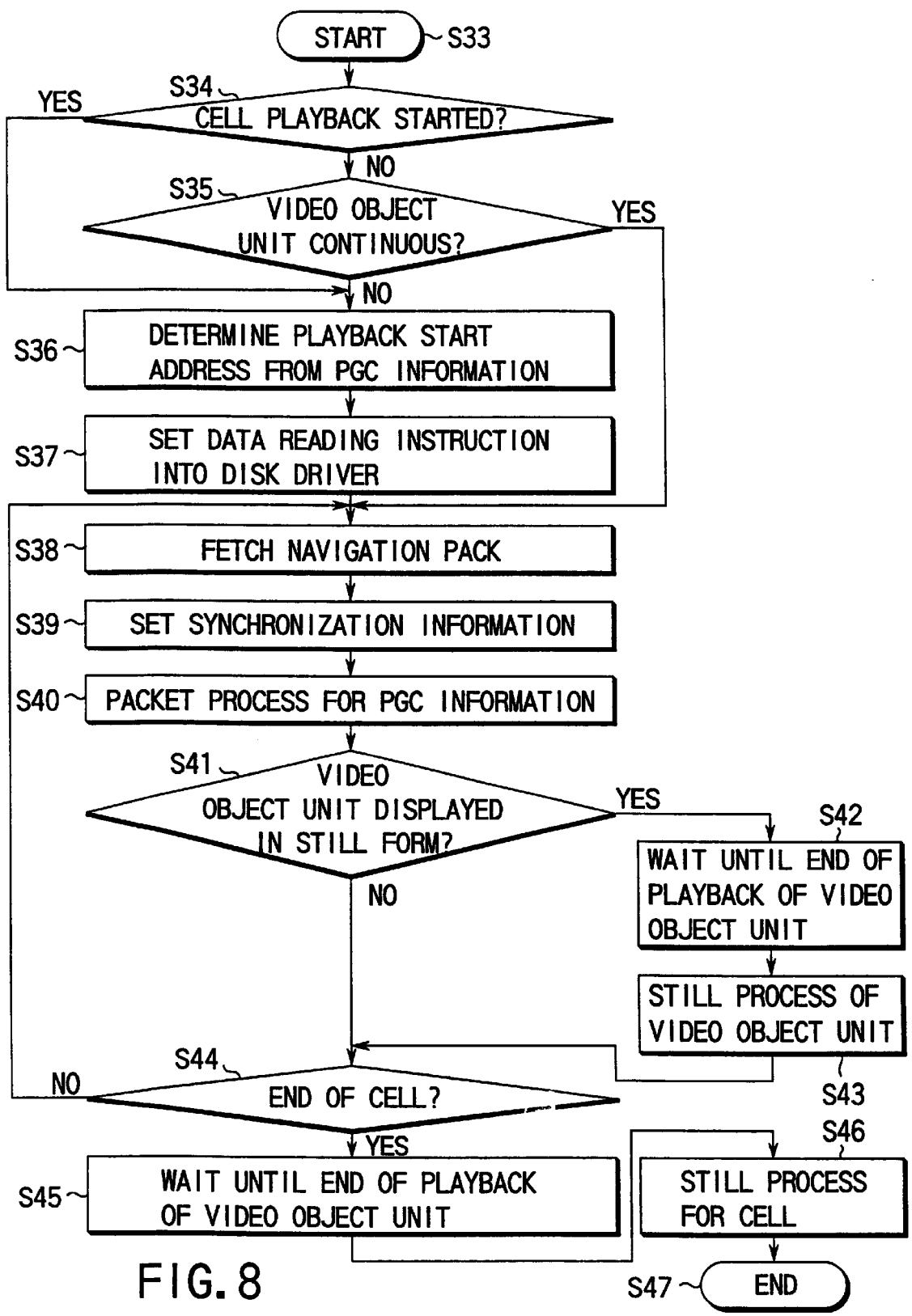
FIG. 8 a flowchart for illustrating the cell playback processing operation in the above data playback operation.

FIG. 8 is a flowchart for illustrating the cell playback processing operation in the step S25. First, when the process is started (step S33), the main MPU 12 determines whether or not the cell playback process is started in the step S34 and if the cell playback process is not started (NO), the main MPU 12 determines whether the video object unit is continuous or not in the step S35.

If it is determined that the video object unit is not continuous (NO) or if it is determined in the step S34 that the cell playback process is started (YES), the main MPU 12 determines the playback start address based on information of PGC in the step S36 and sets the data reading instruction into the disk driver 15 in the step S37.

After the step S37 or when it is determined in the step S35 that the video object unit is continuous (YES), the main MPU 12 fetches the navigation pack in the step S38, sets the synchronization information in the step S39 and then effects the packet process of the PGC information in the step S40.

Then, the main MPU 12 determines whether or not the still display of the video object unit is effected in the step S41, and if the video object unit is displayed (YES), the main MPU 12 waits in the step S42 until the playback for the video object unit which is an object is terminated and effects the still process for the video object unit in the step S43 to continue the still operation until the playback key or the like is operated, for example.

After the step S43 or when it is determined in the step S41 that the still display of the video object unit is not effected (NO), the main MPU 12 determines whether it is the last portion of the cell or not in the step S44, and if it is not the last portion of the cell, the main MPU 12 returns the process to the step S38.

If it is the last portion of the cell (YES), the main MPU 12 waits in the step S45 until the playback of the video object unit which is an object is terminated, effects the cell still process for effecting the still display for a preset period of time in the step S46 and then terminates the process (step S47).

Figure 9:
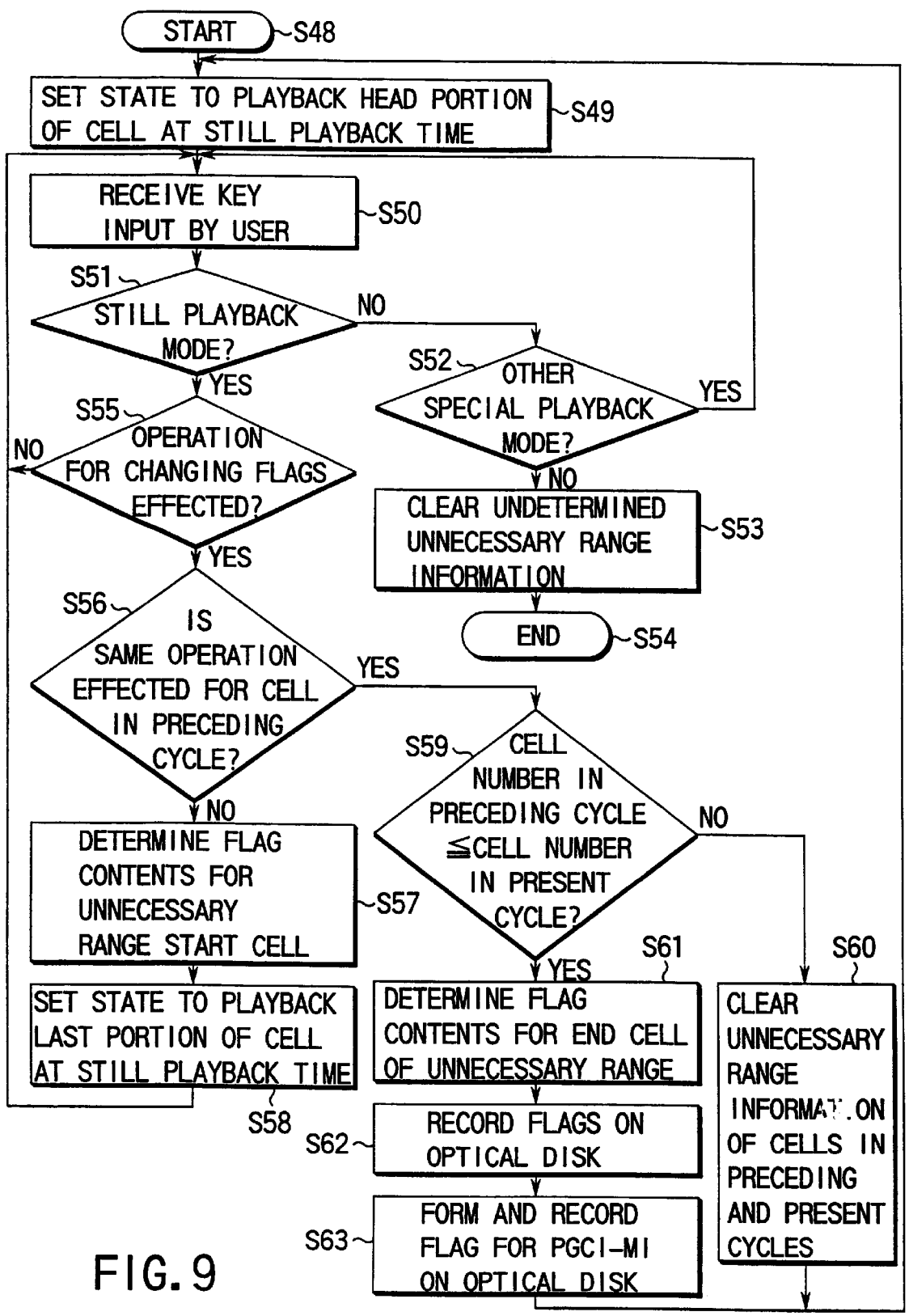
FIG. 9 a flowchart for illustrating the operation of the editing mode for setting a flag for the simple edition.

FIG. 9 is a flowchart for illustrating the edit mode in which the user sets the flags of the PGC information management information 117, PGC identify information 122 and cell type 126.

In the edit mode, first, the normal playback is effected and the user selects a start picture of an unnecessary portion by effecting the still playback or the playback for each frame. In this case, the editable minimum range is set for each cell. Therefore, the recording/playback apparatus is set into a mode in which the first still picture of the cell is played back in the still playback or the playback for each frame and after the user selects the picture, the number of the selected cell is stored.

Likewise, the end picture of the unnecessary portion is selected. However, at this time, the recording/playback apparatus is set into a mode in which a last still picture of the cell is played back in the still playback or the playback for each frame and after the user selects the picture, the number of the selected cell is stored.

That is, the edit mode is started in the playback state of the optical disk 11 (step S48). Then, the main MPU 12 is first switched to a state in which the head portion of the cell is played back at the time of still playback in the step S49 and is set into a state in which the key input by the user is received in the step S50.

After this, the main MPU 12 determines in the step S51 whether it is set in the still playback mode or not, and if it is not the still playback mode (NO), it determines in the step S52 whether it is a playback mode including the other special playback or not. If it is set in the special playback mode (YES), the main MPU 12 returns the process to the step S50, and if it is not the special playback mode (NO), it clears undetermined unnecessary range information (flag) in the step S53 and the process is terminated (step S54).

If it is determined in the step S51 that it is set in the still playback mode (YES), the main MPU 12 determines in the step S55 whether or not the operation for setting the flags of the PGC identify information 122 and cell type 126 into the playback inhibition state is effected, and if the operation is not effected (NO), the process is returned to the step S50.

If it is determined in the step S55 that the operation is effected (YES), the main MPU 12 determines in the step S56 whether the same operation is effected for the cell in the preceding cycle, and if the same operation is not effected (NO), it determines the flag contents of the PGC identify information 122 and cell type 126 for the starting cell of the unnecessary range in the step S57, switches the state to play back the last portion of the cell at the time of still playback in the step S58 and then returns the process to the step S50.

Further, if it is determined in the step S56 that the same operation is effected for the cell in the preceding cycle (YES), the main MPU 12 determines in the step S59 whether or not the cell number in the present cycle is the same as the cell number in the preceding cycle or the cell in the present cycle lies after the cell in the preceding cycle in time, and if the result of determination is "NO", it clears the unnecessary range information (flag) for the cell in the present cycle and the cell in the preceding cycle in the step S60 and returns the process to the step S49.

If the result of determination in the step S59 is "YES", the main MPU 12 determines the flag contents of the PGC identify information 122 and cell type 126 for the end cell of the unnecessary range in the step S61 and records the same on the optical disk 11 in the step S62. After this, the main MPU 12 forms a flag for the PGC information management information 117 and records the same on the optical disk 11 in the step S63 and then returns the process to the step S49.

Next, the operation for deleting a portion which is determined unnecessary in the edit picture or restoring the same into the original title is explained. The user can recognize the list of titles on the screen by opening the title menu as shown in FIG. 10A. At this time, the recording/playback apparatus refers to the flag DUST_DAT Flag of the PGC information management information 117 to determine whether unnecessary data generated after edition is left behind in the titles or not and simultaneously displays information indicating that unnecessary data for the title is present or not on the title menu.

If the user selects a special title on the title menu and sets "open the detail information of the title", the recording/playback apparatus refers to the flags of the PGC identify information 122 and cell type 126 and displays the detail information of the unnecessary portion of the selected title on the screen as shown in FIG. 10B.

The user sees the screen of the detail information for each title and can set the deletion or restoration for each unnecessary portion. If the deletion is selected, the recording/playback apparatus rewrites the contents "01(h)" in the cell type 126 lying in the object unnecessary range into "FF(h)", rewrites the contents "11(h)" in the PGC identify information 122 lying in the object unnecessary range into "01(h)" and completes the operation for deleting the unnecessary portion.

If the restoration is selected, the recording/playback apparatus rewrites the contents of the cell type 126 lying in the object unnecessary range and the contents of the PGC identify information 122 into "00(h)" and completes the restoration. If an unnecessary portion is no more present in the title by effecting the deleting or restoring process, the recording/playback apparatus sets the flag DUST_DAT Flag of the PGC information management information 117 to "00(h)" and permits the title to be processed as a title containing no unnecessary data.

Figure 11:
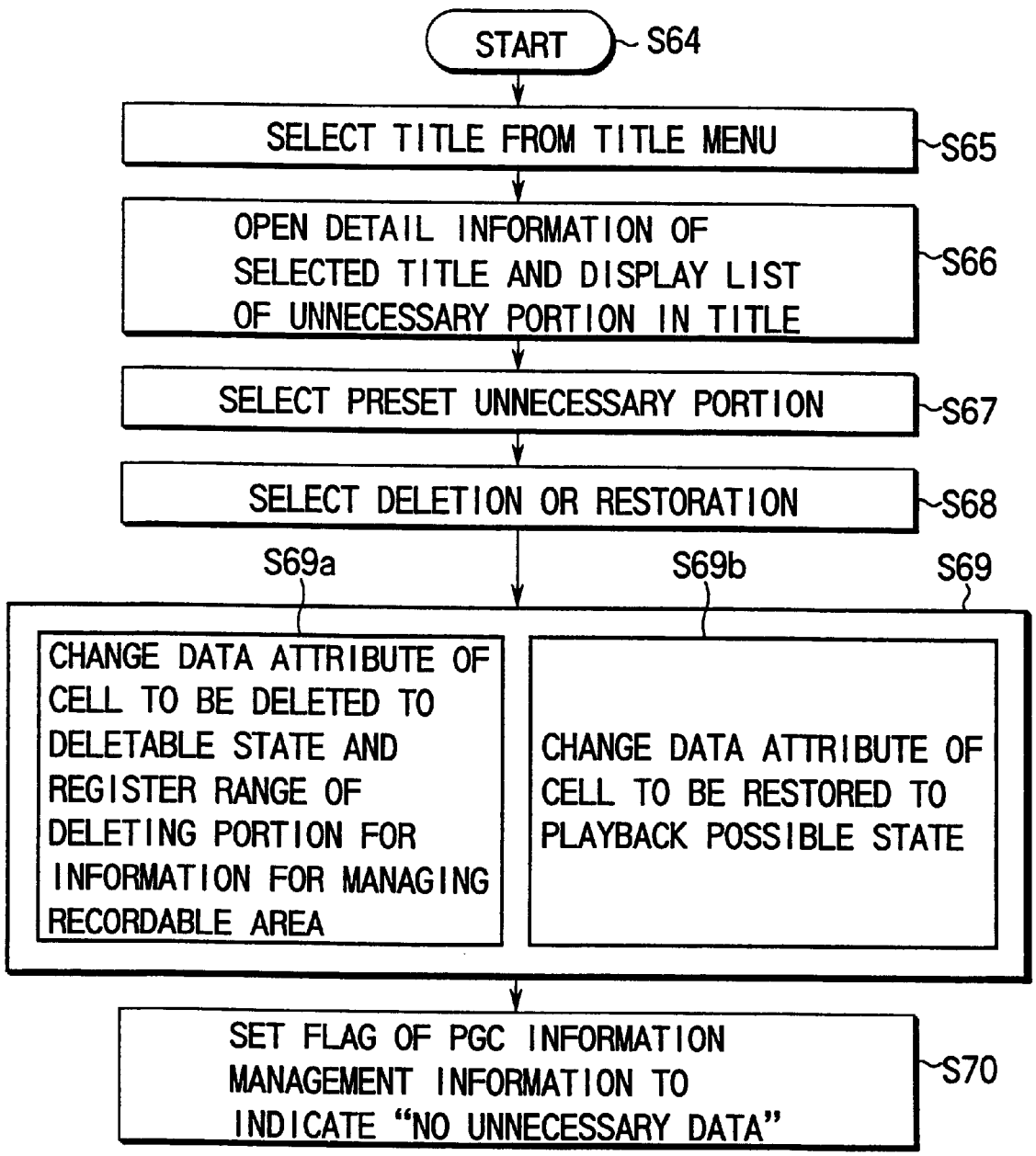
FIG. 11 a flowchart for illustrating the operation for deletion or restoration of an unnecessary portion.

FIG. 11 is a flowchart for illustrating the deleting and restoring operations of the unnecessary portion. First, the title menu is opened as described before and the process is started (step S64), and if the user selects a preset title in the title menu in the step S65, the detail information of the selected title is opened in the step S66. In the detail information, the list of unnecessary portions is displayed as described before.

Then, the user selects a preset unnecessary portion from the displayed list in the step S67 and selects the attribute change of deletion or restoration in the step S68. In this case, if the deletion is selected, the main MPU 12 changes the data attribute of a cell to be deleted to a deletable state as shown in the step S69a. That is, the flags of the PGC identify information 122 and cell type 126 are rewritten as described before. At the same time, the range of a deleting portion is registered for information for managing the recordable area.

Further, if the restoration is selected, the main MPU 12 changes the data attribute of a cell to be restored to a playback possible state as shown in the step S69b. After this, the main MPU 12 sets the flag DUST_DAT Flag of the PGC information management information 117 to indicate "no unnecessary data" in the step S70.

Next, a case wherein the deleting portion is used again is explained. That is, the main MPU 12 forms a deleting portion reference table in which title numbers and corresponding start physical addresses and end physical addresses of unnecessary portions thereof are set as shown in FIG. 12 at the time of formation of the title menu and detail information for each title.

Figure 13:
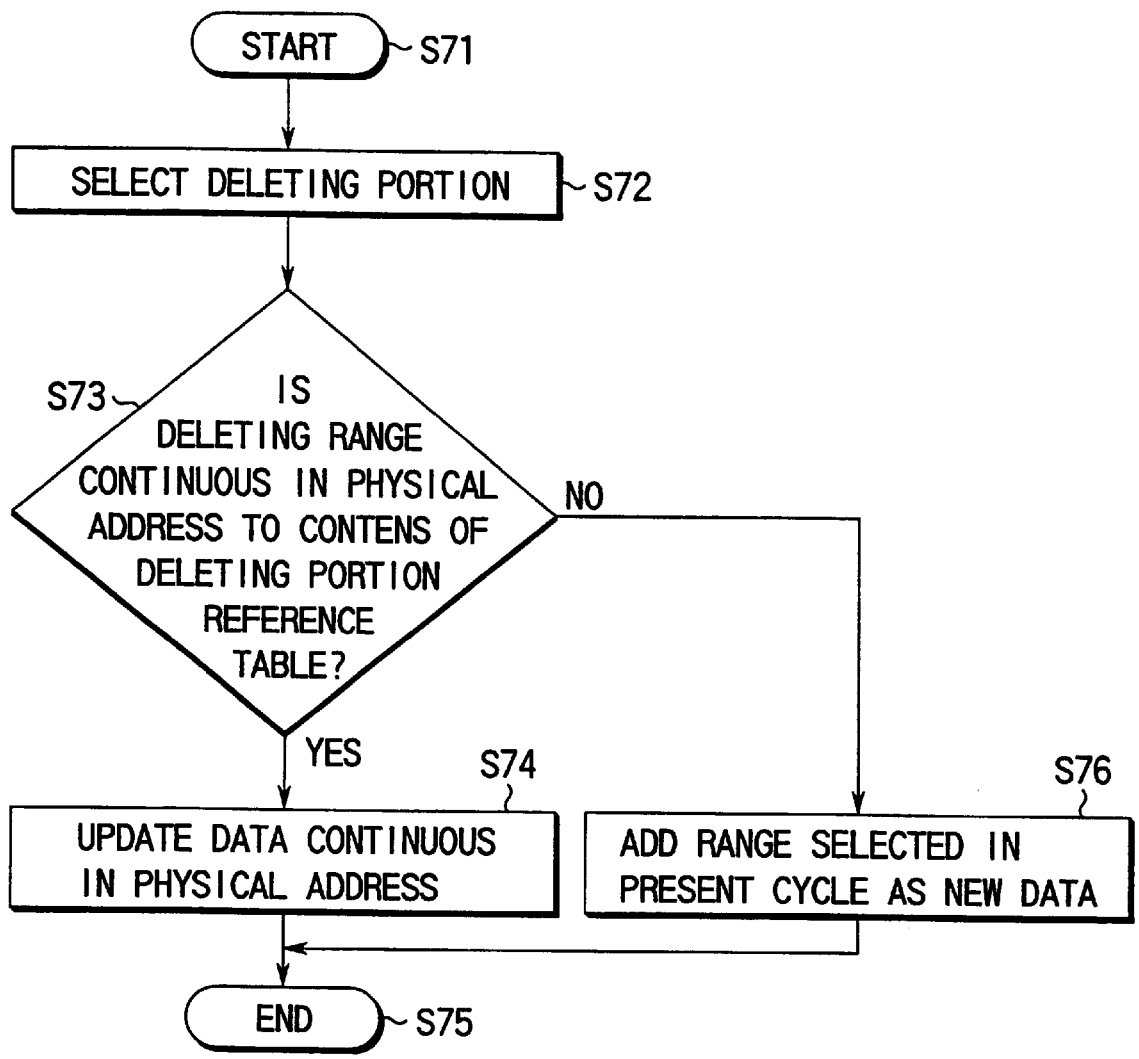
FIG. 13 is a flowchart for illustrating an operation effected when a deleting portion is used again.

Then, as shown in FIG. 13, the process is started (step S71), and if the user selects the deleting portion in the step S72, the main MPU 12 determines in the step S73 whether or not the deleting portion is continuous in physical address to the contents of the deleting portion reference table. If the deleting portion is continuous (YES), the MPU 12 updates table data which is continuous in physical address, that is, it rewrites a new range for existing data (step S74). The MPU 12 then terminates the process (step S75).

If it is determined in the step S73 that the deleting portion is not continuous (NO), the main MPU 12 adds the range selected at this time to the table as new data in the step S76 and terminates the process (step S75).

Figure 14:
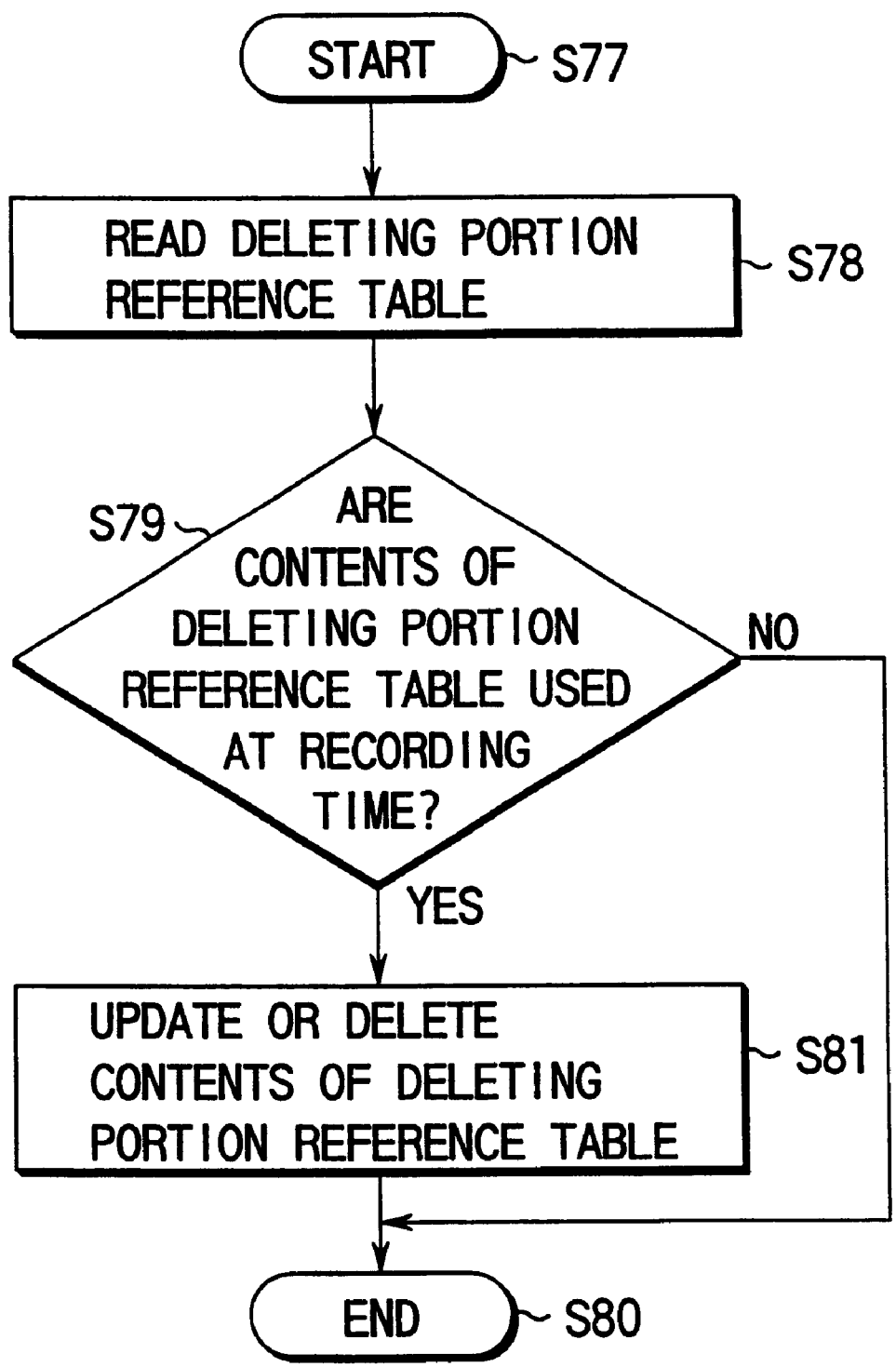
FIG. 14 is a flowchart for illustrating another operation effected when a deleting portion is used again.

FIG. 14 shows another example in which the deleting portion is used again. That is, when the process is started (step S77), the main MPU 12 reads the deleting portion reference table in the step S78, determines in the step S79 whether the contents of the deleting portion reference table are used at the time of recording, and if the deleting portion reference table is not used (NO), the process is terminated (step S80), and if the deleting portion reference table is used (YES), the contents of the deleting portion reference table is updated or deleted in the step S81 and the process is terminated (step S80).

In the above embodiment, a case wherein each cell is previously divided in the unit of GOP at the time of recording data on the optical disk 11, that is, the GOP is completed in each cell is explained. However, the cell can be divided in the intermediate portion of the GOP.

For example, as shown in FIG. 15, cells A, B, C, D can be specified for continuous GOPs 1 to 6 to set the boundary between the cells A and B on the intermediate portion of the GOP 2, set the boundary between the cells B and C on the intermediate portion of the GOP 4 and set the boundary between the cells C and D on the intermediate portion of the GOP 5.

Generally, one GOP is constructed by 15 pictures corresponding to 0.5 second as shown in FIG. 16. More specifically, one intra-frame coded picture [I (Intra) picture] obtained by subjecting the whole portion of one picture to the intra-frame coding process is arranged in the head portion of the GOP, and after this portion, four inter-frame coded pictures [P (Predictive) picture] predicted from the already coded preceding frame and 10 inter-frame coded pictures [B (Bidirectionally) predictive picture] predicted from two frames which lie earlier and later in time are arranged in a preset order. Therefore, if the I picture arranged in the head portion of the GOP is not read, one screen of the GOP cannot be played back.

Assume now that the flag of playback inhibition is set in the cell type 126 of the cell B in FIG. 15 and continuous playback is effected from the cell A to the cell C. In this case, the recording/playback apparatus is operated to read data in the head portion of the cell C after completing the playback of the cell A. However, since the head position of the cell C lies on the intermediate portion of the GOP 4, only the P picture or B picture can be read and one screen of the GOP 4 cannot be played back.

Therefore, the recording/playback apparatus is controlled to automatically search for the I picture in the head portion of the GOP and play back the same when the head position of the cell to be played back lies on the intermediate portion of the GOP.

Figure 17:
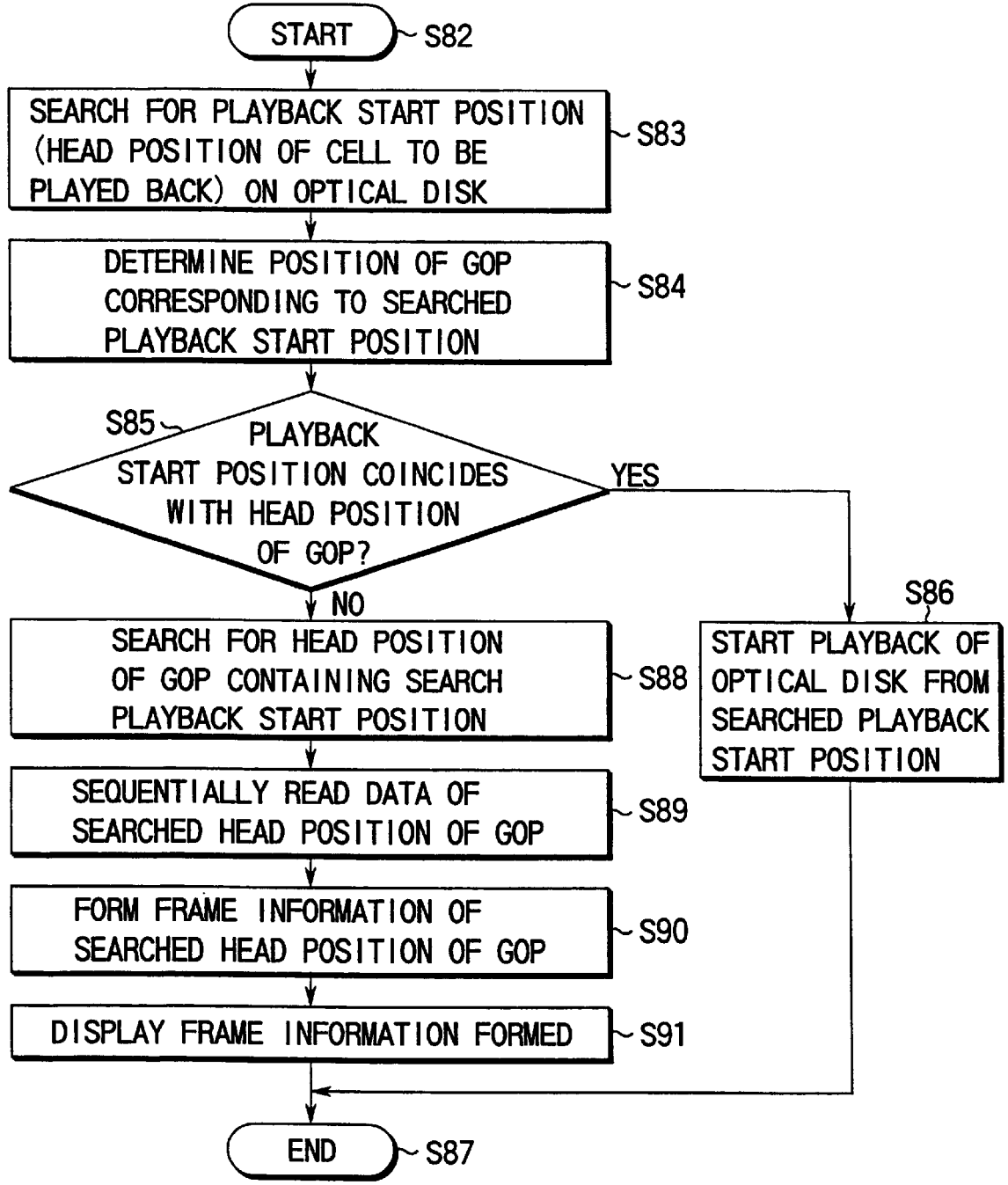
FIG. 17 is a flowchart for illustrating the playback operation effected when the head portion of a cell to be played back lies on the intermediate portion of the GOP.

FIG. 17 is a flowchart for illustrating the control operation. First, when the process is started (step S82), the main MPU 12 searches for the playback starting position on the optical disk 11, that is, the head position of the cell C in the above example in the step S83.

Then, the main MPU 12 determines the position of the GOP corresponding to the searched playback starting position in the step S84. The searching and determining process is effected by causing the main MPU 12 to refer to information of the control manager information 108 described before, for example.

Next, the main MPU 12 determines in the step S85 whether or not the playback starting position coincides with the head position of the GOP, and if the coincidence is detected (YES), it starts the playback operation of the optical disk 11 from the searched playback starting position in the step S86 and then the process is terminated (step S87).

Further, if it is determined in the step S85 that the playback starting position does not coincide with the head position of the GOP (NO), the main MPU 12 searches for the head position of the GOP including the searched playback starting position in the step S88 and sequentially reads data from the searched head position of the GOP in the step S89.

After this, the main MPU 12 forms frame information of the head position of the GOP in the video processor 33 in the step S90, displays the frame information in the step S91 and then terminates the process (step S87). Thus, even if the head position of the cell which is required to be played back lies on the intermediate portion of the GOP, the cell can be played back.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording medium, comprising:
   a first area configured to record main video data, wherein said main video data is defined as a plurality of units, and each of the units comprises a group of pictures (GOP) respectively, said first area having a partial area in which specified video data exists as a part of said main video data;
   a second area configured to record management information, wherein said management information includes information for managing said specified video data as an unnecessary cell, and managing other video data as playable cells; and
   a third area provided in the second area and configured to record start and end address information of said unnecessary cell, wherein said start and end address information is included in said management information and specifies a unit of video field in the group of pictures.

2. A recording medium according to claim 1, wherein said start and end address information further specifies said playable cells.

3. A recording medium according to claim 1, wherein said group of pictures is data processed by an MPEG compression system.

4. A recording/playback apparatus for recording and playing back video information by using a recordable/playable medium, said recordable/playable medium comprising (i) a first area configured to record main video data, wherein said main video data is defined as a plurality of units, and each of the units comprises a group of pictures (GOP) respectively, said first area having a partial area in which specified video data exists as a part of said main video data, and (ii) a second area configured to record management information, wherein said management information includes information for managing said specified video data as an unnecessary cell, and other video data as playable cells, said recording/playback apparatus comprising:
   recording means for recording start and end address information of said unnecessary cell, wherein said start and end address information is included in said management information and specifies a unit of video field in the group of pictures.

5. A recording/playback apparatus according to claim 4, further comprising restoring processing means for restoring said unnecessary cell by changing attribute information which is related to said unnecessary cell.

6. A recording/playback apparatus according to claim 4, further comprising reproduction processing means for reading the management information and displaying menu information indicating unnecessary data information corresponding to said unnecessary cell.

7. A recording/playback method for recording and playing back video information by using a recordable/playable medium, said recordable/playable medium comprising (i) a first area configured to record main video data, wherein said main video data is defined as a plurality of units, and each of the units comprises a group of pictures (GOP) respectively, said first area having a partial area in which specified video data exists as a part of said main video data, and (ii) a second area configured to record management information, wherein said management information includes information for managing said specified video data as an unnecessary cell, and other video data as playable cells, said recording/playback method comprising a step of:
   recording start and end address information of said unnecessary cell, wherein said start and end address information is included in said management information and specifies a unit of video field in the group of pictures.

8. A recording method for recording and playing back video information by using a recordable/playable medium, said recordable/playable medium comprising (i) a first area configured to record main video data, wherein said main video data is defined as a plurality of units, and each of the units comprises a group of pictures (GOP) respectively, said first area having a partial area in which specified video data exists as a part of said main video data, and (ii) a second area configured to record management information, wherein said management information includes information for managing said specified video data as an unnecessary cell, and other video data as playable cells, said recording method comprising a step of:
   recording start and end address information of said unnecessary cell, wherein said start and end address information is included in said management information and specifies a unit of video field in the group of pictures.

9. A recording/playback apparatus for recording and playing back video information by using a recordable/playable medium, said recordable/playable medium comprising (i) a first area configured to record main video data, wherein said main video data is defined as a plurality of units, and each of the units comprises a group of pictures (GOP) respectively, said first area having a partial area in which specified video data exists as a part of said main video data, and (ii) a second area configured to record management information, wherein said management information includes information for managing said specified video data as an unnecessary cell, and other video data as playable cells, said recording/playback apparatus comprising:
   recording means for recording start and end address information of said unnecessary cell, wherein said start and end address information is included in said management information and specifies a unit of video field in the group of pictures; and reproducing means for reproducing a video image which is positioned after a specified position corresponding to the end address information of said unnecessary cell, wherein said reproducing means starts a video coding process from I picture arranged at a head of the group of pictures, and outputs said video image corresponding to the next position of said specified position.

10. A recording/playback method for recording and playing back video information by using a recordable/playable medium, said recordable/playable medium comprising (i) a first area configured to record main video data, wherein said main video data is defined as a plurality of units, and each of the units comprises a group of pictures (GOP) respectively, said first area having a partial area in which specified video data exists as a part of said main video data, and (ii) a second area configured to record management information, wherein said management information includes information for managing said specified video data as an unnecessary cell, and other video data as playable cells, said recording/playback method comprising steps of:

recording start and end address information of said unnecessary cell, wherein said start and end address information is included in said management information and specifies a unit of video field in the group of pictures; and reproducing a video image which is positioned after a specified position corresponding to the end address information of said unnecessary cell, wherein said reproducing starts a video coding process from I picture arranged at a head of the group of pictures, and outputs said video image corresponding to the next position of said specified position.

11. A playback method for recording and playing back video information by using a recordable/playable medium, said recordable/playable medium comprising (i) a first area configured to record main video data, wherein said main video data is defined as a plurality of units, and each of the units comprises a group of pictures (GOP) respectively, said first area having a partial area in which specified video data exists as a part of said main video data, (ii) a second area configured to record management information, wherein said management information includes information for managing said specified video data as an unnecessary cell, and other video data as playable cells, and (iii) a third area provided in a second area and configured to record start and end address information of said unnecessary cell, wherein said start and end address information is included in said management information and specifies a unit of video field in the group of pictures, said playback method comprising a step of:

reproducing a video image which is positioned after a specified position corresponding to the end address information of said unnecessary cell, wherein said reproducing starts a video coding process from I picture arranged at a head of the group of pictures, and outputs said video image corresponding to the next position of said specified position.

* * * * *